United States Patent
Lygas

(10) Patent No.: US 6,879,848 B2
(45) Date of Patent: Apr. 12, 2005

(54) METHOD AND APPARATUS FOR ALERTING AN OPERATOR OF AN INCOMING CELLULAR OR PORTABLE PHONE CALL

(75) Inventor: Edward A. Lygas, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 520 days.

(21) Appl. No.: 10/020,566

(22) Filed: Dec. 14, 2001

(65) Prior Publication Data

US 2002/0082055 A1 Jun. 27, 2002

Related U.S. Application Data

(63) Continuation-in-part of application No. 08/999,036, filed on Dec. 29, 1997.

(51) Int. Cl.[7] .............................. H04B 1/38; H04M 1/00
(52) U.S. Cl. ................ 455/567; 455/412.2; 455/404.2; 455/566; 455/404.1; 455/426.1; 455/42; 455/703; 379/211.01; 379/373.02; 379/252; 340/384.4; 340/286.11; 340/870.09; 340/856.4; 340/328
(58) Field of Search ................................. 455/567, 566, 455/42, 412.2, 70.3; 379/373.01, 373.02, 252; 340/384.4, 286.11, 870.09, 856.4, 855.6, 328

(56) References Cited

U.S. PATENT DOCUMENTS

| | | | | |
|---|---|---|---|---|
| 4,380,759 A | * | 4/1983 | Sulkoski et al. ......... | 340/407.1 |
| 5,488,351 A | * | 1/1996 | Hedayatnia et al. ..... | 340/407.1 |
| 5,790,958 A | * | 8/1998 | McCoy et al. ............... | 455/557 |
| 5,845,219 A | * | 12/1998 | Henriksson .................. | 455/567 |
| 5,854,826 A | * | 12/1998 | Kim ............................. | 379/68 |
| 5,861,704 A | * | 1/1999 | Kitami et al. ................ | 310/369 |
| 5,867,105 A | * | 2/1999 | Hajel ....................... | 340/691.3 |
| 5,894,263 A | * | 4/1999 | Shimakawa et al. ...... | 340/388.1 |
| 5,973,441 A | * | 10/1999 | Lo et al. ...................... | 310/330 |
| 6,078,126 A | * | 6/2000 | Rollins et al. ............... | 310/330 |
| 6,119,022 A | * | 9/2000 | Osborn et al. .............. | 455/567 |
| 6,240,176 B1 | * | 5/2001 | Lygas .................... | 379/374.03 |

* cited by examiner

Primary Examiner—Marceau Milord
(74) Attorney, Agent, or Firm—John L. Rogitz

(57) ABSTRACT

A method and apparatus for notifying a user of an incoming cellular telephone call are provided. The apparatus includes a cellular telephone body having at least a back surface, a first transducer positioned within said cellular telephone body perpendicular to the back surface and adapted to generate a first acoustic field, and a second transducer positioned coaxially to the first transducer and adapted to generate a second acoustic field. A first frequency generator is coupled with the first transducer to drive the first transducer to generate the first acoustic field and a second frequency generator is coupled with the second transducer to drive the second transducer to generate the second acoustic field in response to an indication that an incoming cellular telephone call has been received. The first and second acoustic fields overlap. The overlapping fields generate a vibrational sensation from a difference of frequency from unequal frequencies generated by the first and second transducers. The vibration sensation being maintained from the overlapping fields at a user's tissue, thereby indicating to a user that an incoming cellular telephone call has been received. A corresponding method for implementing the apparatus is also provided in accordance with the invention.

28 Claims, 2 Drawing Sheets

METHOD AND APPARATUS FOR ALERTING AN OPERATOR OF AN INCOMING CELLULAR OR PORTABLE PHONE CALL

This is a Continuation-in-Part of U.S. patent application Ser. No. 08/999,036, filed Dec. 29, 1997 by Edward Lyga, entitled METHOD AND APPARATUS FOR ALERTING AN OPERATOR OF AN INCOMING CELLULAR OR PORTABLE PHONE CALL, which is incorporated herein by reference.

BACKGROUND OF THE INVENTION

This invention relates generally to a method and apparatus for alerting an operator of an incoming call for a cellular phone or portable phone and more particularly to a method and apparatus for privately alerting an operator of an incoming telephone call which can also operate through a variety of types, and plurality of layers of clothing or the like.

In recent years the use of cellular phones has greatly increased. When receiving an incoming telephone call, the conventional cellular phone notification system emits an audible ring to notify the user of the incoming call. While this audible ring allows the user of the cellular phone to be made aware of the incoming call, this audible ring also alerts others within hearing distance of the user of the incoming phone call. Additionally, if a large number of cellular phone users are present in a particular location, the large number of audible rings which may be generated may be very great. Others in the vicinity of the cell phone and thus within distance of the audible ring may be disturbed by this audible ring. Finally, in many situations, such as live performances, libraries, and even court houses, the audible cellular phone ring may upset the proceedings. Therefore, in many of these locations, it is required that the cellular phone be turned off during entry or performance.

However, when the cellular phone is turned off, an emergency telephone call or the like may be missed. For the period of time the cellular phone is turned off, the user is out of touch and cannot be reached. This time period may be very important, and possibly detrimental if the user of the phone is, by way of example, a doctor, or is awaiting an important telephone call for any other reason.

Therefore, in order to remedy this problem, cellular phones have been provided with an inaudible method for alerting an operator of an incoming telephone call. Specifically, the cellular phone vibrates, and in turn provides a vibration to the user upon receipt of an incoming telephone call. This vibration is inaudible, and therefore informs the user of an incoming telephone call without alerting or affecting others adjacent the user. Thus, when an incoming telephone call is received, those adjacent the telephone user will not be bothered. While this use of a vibrating notification of an incoming telephone call has solved many problems of the prior art, many problems still exist.

For example, since the vibration is used as the method for alerting the operator of an incoming telephone call, it is necessary to maintain the cellular phone adjacent a user's body. Therefore, it is often necessary for the user to carry the cellular phone around on his or her belt so that any vibration will be recognized by the user. However, the carrying of a cellular phone on one's belt often looks unprofessional, and may not be desired by a particular user.

Additionally, since a vibration is provided, it is necessary that only a small number of layers of clothing or the like be positioned between the cellular phone and a user's body. If too many layers are provided, the user will not be aware of the vibration of the cellular phone indicating an incoming telephone call. Thus, this requirement poses an additional limitation on the user, and may be inconvenient if the weather is cold. Specifically, if the user is wearing a large number of layers of clothing, the cellular phone is required to be placed adjacent the user's body, or inside a large portion of the clothing. Consequently, upon vibration of the phone to indicate an incoming telephone call, it may be difficult for the user to gain access to the cellular phone quickly enough to answer the incoming telephone call.

Therefore, it would be beneficial to provide a method and apparatus of alerting an operator of an incoming cellular or portable telephone call which overcomes the problems of the prior art.

OBJECT OF THE INVENTION

Accordingly, it is an object of the invention to provide an improved method and apparatus for alerting an operator of an incoming call for a cellular or portable telephone.

Another object of the invention is to provide an improved method and apparatus for alerting an operator of an incoming call for a cellular telephone which privately alerts a user of the incoming telephone call.

A further object of the invention is to provide an improved method and apparatus for alerting an operator of an incoming call for a cellular or portable telephone which privately alerts the operator of the incoming phone call, and does not require that the telephone be maintained adjacent a user's body.

Still another object of the invention is to provide an improved method and apparatus for alerting an operator of an incoming call or a cellular or portable telephone which produces a low frequency vibration sensation in human tissue when an incoming telephone call is received.

A still further object of the invention is to provide an improved method an apparatus for alerting an operator of an incoming call for a cellular or portable telephone which uses a dual, high frequency beams to generate a low frequency sensation in human tissue to alert a user of an incoming telephone call.

Still objects and advantages of the invention will in part be obvious and will in part be apparent from the specification and drawings.

SUMMARY OF THE INVENTION

Generally speaking in accordance with the invention, an improved method and apparatus for alerting an operator of an incoming call for a cellular or portable telephone is provided. The alerting apparatus is constructed of two concentric piezoelectric elements driven electrically at differing high frequencies. Frequencies differ by from between 10 to 100 cycles in a preferred embodiment. Since human body tissue is non-linear, a difference frequency is created in the body tissue as a result of the overlapping of the two acoustic fields generated by the concentric piezoelectric elements. This difference frequency further generates a low frequency vibration sensation in human tissue which can be recognized by the user. The concentric piezoelectric elements are positioned within a cellular or portable phone or its battery coaxially with their axes positioned perpendicularly to the plane of the surface of the phone.

Additionally, this same notification technology may be applied to a beeper, or an alarm system for alerting a particular person that a certain time has arrived, while allowing adjacent individuals not to be affected. The invention also may be used for alerting a person standing in a hazardous area that he or she may be in danger, or for alerting a person that an automatic opening door, or other automatic apparatus may pose a danger to him in his current location, or the like.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
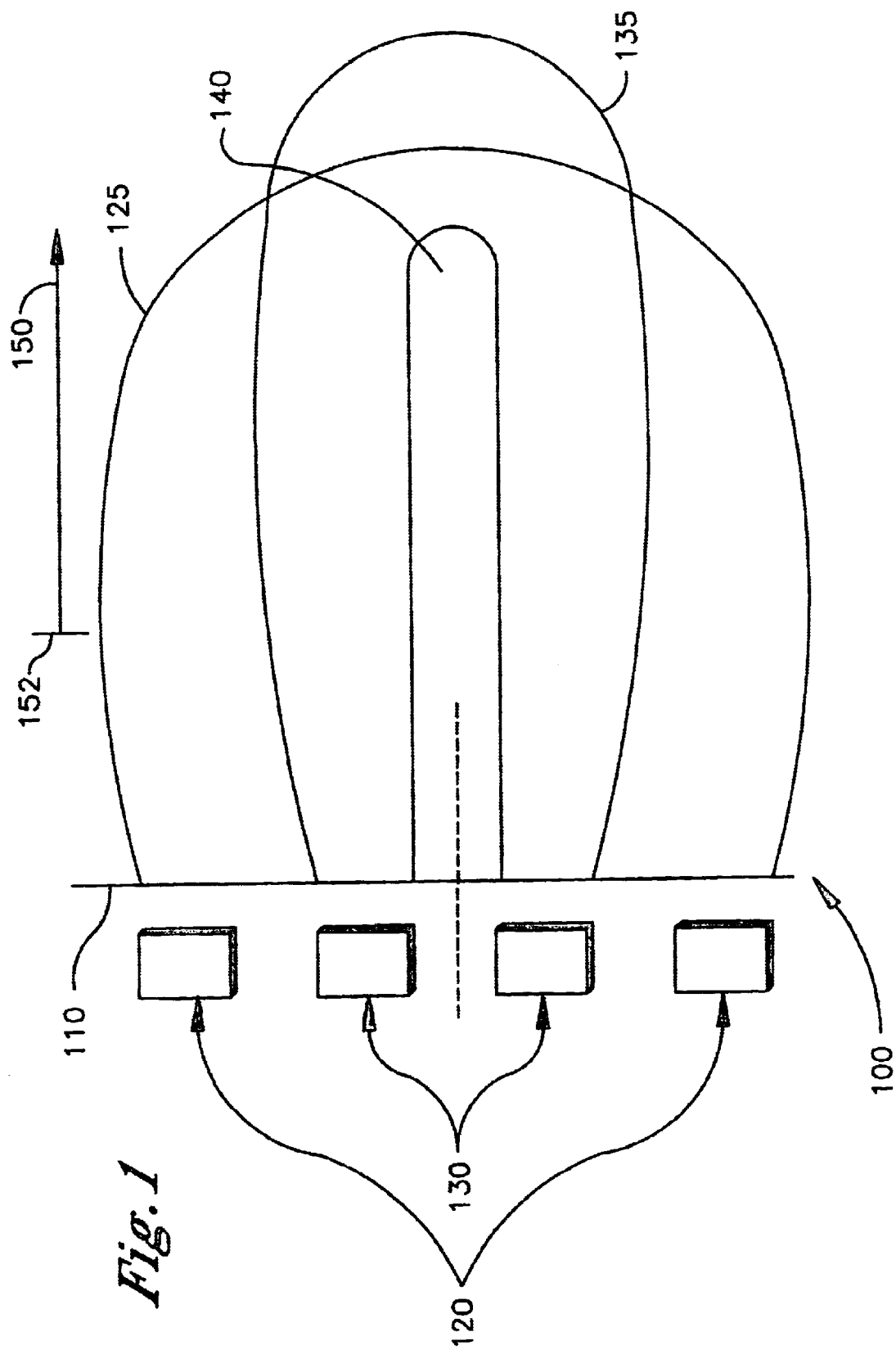
FIG. 1 is a schematic view depicting the structure of generated beam patterns of an apparatus constructed in accordance with the invention.

Referring first to FIG. 1, a low frequency sensation generator is depicted, indicated generally at 100. Sensation generator 100 is further formed of concentric elements 120 and 130. Each of concentric elements 120 and 130 are preferably formed of a piezoelectric material, and are shaped into a cylinder, or alternatively into a ring. When first concentric element 120 is electrically driven, first concentric element 120 generates an acoustic field 125. Field 125 is shaped in accordance with the diameter of first concentric element 120. Field 125 is generated at a frequency corresponding to the driving frequency of first concentric element 120.

Similarly, when second concentric element 130 is electrically driven, an acoustic field 135 is generated. Field 135 is shaped according to the diameter of second concentric element 130. The frequency of field 135 is determined in accordance with the driving frequency of second concentric element 130. Coaxial elements 120 and 130 are provided positioned in a direction perpendicular to a wall 110 of a cellular phone so that fields 125 and 135 generated therefrom are directed in a direction perpendicular to wall 110 as well. Also, the first and second concentric elements can be considered transducers, electrodes or the like devices having frequency generating qualities.

Fields 125 and 135 overlap as are shown in FIG. 1. If first and second concentric elements 120 and 130 are driven at different frequencies, then fields 125 and 135 will also be operating at different frequencies. Therefore, an area of high intensity 140 is generated in the presence of a non-linear acoustic medium having a frequency of the difference between the frequencies of field 125 and 135. In a preferred embodiment the driving frequencies of first and second concentric elements 120 and 130 differ by between 10 and 100 cycles.

Arrow 150 indicates the area of tissue of a user, termination line 152 of arrow 150 indicating the skin border of a user. As is further shown in FIG. 1, high intensity area 140 reaches beyond the skin of a user indicated by terminal line 152 of arrow 150. Because body tissue is a non-linear substance, the difference frequency of high intensity area 140 produces a vibration in the body tissue of the user. The body tissue of the user can sense this vibration, thereby indicating that the apparatus has been switched on. As is shown in FIG. 1, since the user is notified of an incoming telephone call through the overlap of high intensity of portion 140 and human tissue 152, there is no need for direct contact between wall 110 of the cellular phone and a user's body. Therefore, this notification apparatus for a cellular telephone will operate up to a predetermined distance from a user's skin, as long as high intensity area 140 overlaps with a user's skin. Thus, by utilizing cylindrical elements 120 and 130 having a longer coaxial distance, or other characteristics, a longer field can be generated, and therefore a longer detection distance can also be generated.

Therefore, it is possible to provide a cellular phone notification system which operates through any desired number of clothing layers, and possibly over any desired distance. Furthermore, by providing a user with an apparatus for adjusting the coaxial length of concentric cylindrical elements 120 and 130, it is possible to allow a user to adjust the notification distance as is necessary.

Figure 2:
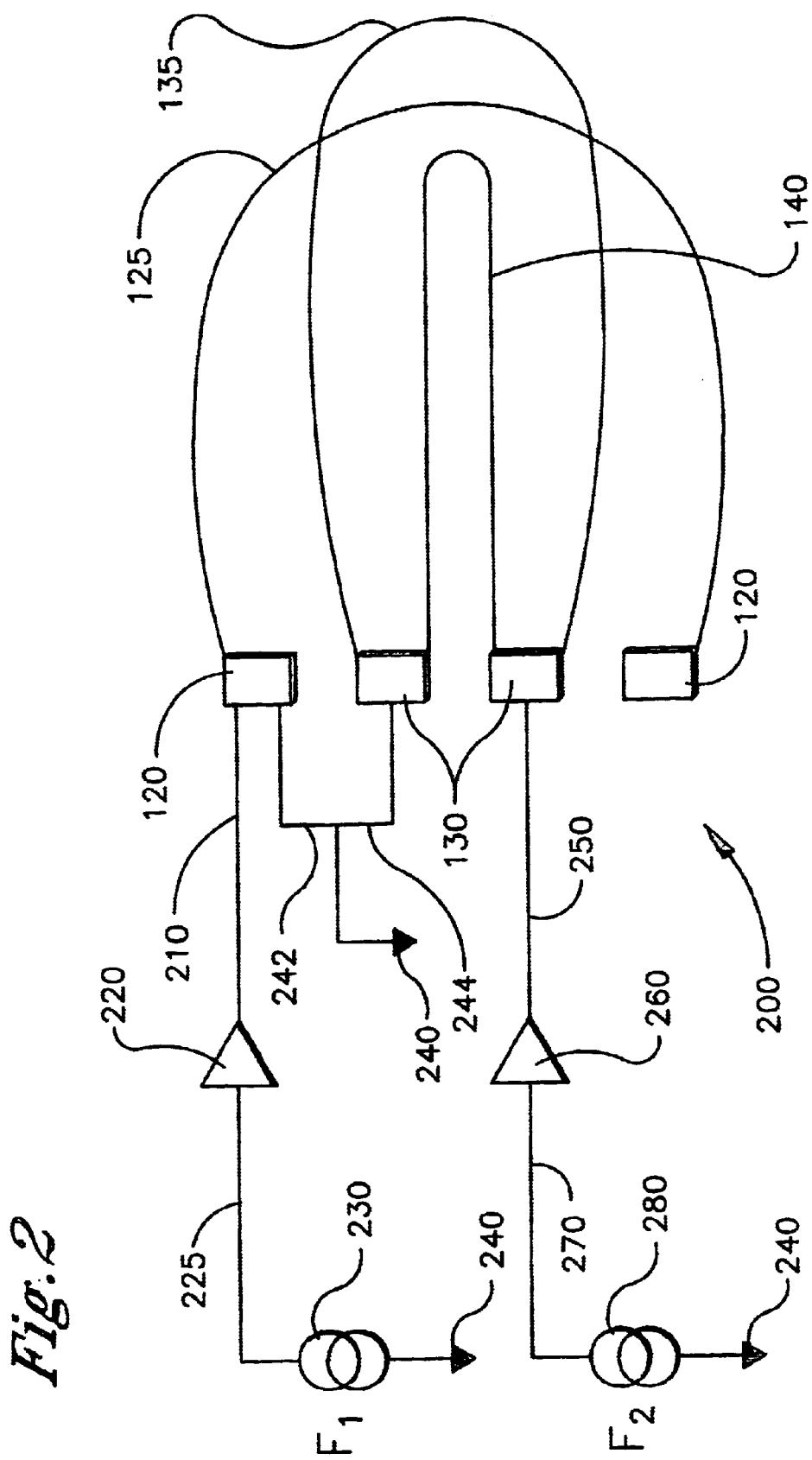
FIG. 2 is a schematic drawing depicting frequency beam generation apparatus constructed in accordance with the invention.

Referring next to FIG. 2, an indication generator 200 constructed in accordance with the invention is depicted. As is shown in FIG. 2, concentric elements 120 and 130 generating fields 125 and 135 respectively are provided. Additionally, high intensity area 140 is similarly provided. First concentric element 125 is driven by a frequency generator 230 generating frequency $F_1$. One terminal of frequency generator 230 is connected to a ground 240, the other terminal of frequency generator 230 generating frequency $F_1$ on line 225. Frequency $F_1$ on line 225 is further passed through a tuned amplifier 220. This amplified $F_1$ signal is passed from amplifier 220 along a line 210 to drive first concentric element 120. Concentric element 120 is similarly connected to ground 240 via a line 242.

Second concentric element 130 is similarly driven at a frequency $F_2$. Thus, frequency generator 280 generates a frequency $F_2$, which is forwarded via a line 270, through a tuned amplifier 260, and further via a line 250 to concentric element 130. Frequency generator 280 is also connected to ground 240. Finally, second concentric element 130 is also connected to ground 240 via a line 244.

Therefore, in accordance with the invention, indication generator 200, each of first and second concentric elements 120 and 130 are respectively driven at frequencies $F_1$ and $F_2$. In a preferred embodiment, frequencies $F_1$ and $F_2$ are set to high frequencies and also differ by approximately between 10 and 100 cycles. The drivers for concentric elements 120 and 130 are of the switched type, and feed a tuned series circuit which may be tuned by the adjustment of frequency generators 230 and 280. Additionally, frequency generators 230 and 280 may be preferably digitally controlled, and current limited to insure the accuracy, and safety of the apparatus.

During use, when an incoming telephone call is received, cellular phone (not shown) indicates the receipt of such a call to each of frequency generators 230 and 280. These frequency generators generate signals at frequencies $F_1$ and $F_2$, respectively, which are predetermined frequencies. Upon generation of each of frequencies $F_1$ and $F_2$, first concentric element 120 generates field 125, while second concentric element 130 generates field 135. A high intensity area 140 is generated at the frequency difference $F_1-F_2$ of fields 125 and 135. If this high intensity area is brought into contact with a user's skin, a vibrational sensation will be generated in the user's tissue, and the user will be made aware of the incoming telephone call.

As noted above, since direct contact between the user and the indicator apparatus is not required, the apparatus can be designed to penetrate any number of layers of clothing or the like, and to alert a user from any particular distance. Additionally, since the sensation is directional in accordance with the fields generated from each of the concentric elements. Only the intended recipient of the indication will be notified of the incoming telephone call, and no other people will be effected by the field generation. Furthermore, since no audible sound is generated, no additional people in the area of the user will be aware of the telephone call, or will be effected by an audible ring.

While this invention has been described with an indicator with respect to a cellular phone, a similar apparatus may be used with respect to a more simple portable phone, which comprises a base unit and a hand held unit, which are in contact via radio frequency. In this apparatus, the invention would work similarly, since the indicator apparatus would be positioned similarly within the hand held portion of the telephone.

Furthermore, it would be possible to use the indicator apparatus of the invention in accordance with a beeper along the same lines as that of the cellular phone noted above. Specifically, the beeper would be provided with such a mechanism, which when worn close to the user, would allow for indication of an incoming message to a user without an audible sound, and without requirement that the beeper be positioned adjacent a user's tissue.

Furthermore, this apparatus has a variety of other uses, such as an attachment to an alarm clock which would allow a single user to be awakened while allowing a second person who would normally be within range of the audible sound of the alarm clock to not be awakened by the alarm indicator. Such an indicator may be provided as a wrist band, or may further be provided as a mechanism positioned within a mattress or bed so that a user is not required to wear any additional material. In this manner, since the apparatus need not be in contact with the user's skin, placing it inside the mattress would be sufficient to allow the user to awaken from the sensation generated by the indicator.

Finally, it would be possible to allow a user to wear an indicator which was directed simply to receive a signal, and turn on when a signal is received. This could be used, for example, in a plant or other manufacturing facility. The indicator could be activated automatically upon entry of a user into a specific area which may be hazardous, such as in the way of moving equipment, or in the way of a swinging door. Furthermore, the invention further would allow a person standing within a predetermined area to be notified of an event without wearing any device. For example, if a user is in the way of an opening door, an apparatus providing a signal having a sufficiently overlapping field could be provided within the door, and which can be activated when the door is to be opened. Thus, anyone within the range of the overlapping field will be notified of the activity when the apparatus is activated. This mechanism might be extremely valuable in a workplace where an audible alarm may not be able to be heard very easily. Therefore, in this manner a more safe work place environment can be provided.

It will thus be seen that the objects set forth above, among those made apparent from the preceding description, are efficiently attained and, since certain changes may be made in carrying out the above method and in the constructions set forth without departing from the spirit and scope of the invention, it is indented that all matter contained in the above description and shown in the accompanying drawings shall be interpreted as illustrative and not in a limiting sense.

It is also to be understood that the following claims are intended to cover all of the generic and specific features of the invention herein described and statements of the scope of the invention which, as a matter of language, might be said to fall therebetween.

What is claimed:

1. An apparatus for notifying a user, comprising:
   a first cylindrical transducer adapted to generate a first acoustic field having a first frequency;
   a first frequency generator coupled with said first cylindrical transducer;
   a second cylindrical transducer positioned coaxially to said first cylindrical transducer and adapted to generate a second acoustic field having a second frequency not equal to said first frequency; and
   a second frequency generator coupled with said second cylindrical transducer, said first and second acoustic fields are proximate to a user's tissue, and exhibit an overlapping portion within the user's tissue with said overlapping portion generating a vibrational sensation inside the user's tissue; and
   whereby said vibrational sensation results from a difference frequency generated in the user's tissue by said overlapping portion within the user's tissue of said first and second acoustic fields.

2. The apparatus of claim 1, wherein said notification apparatus is positioned within a cellular telephone.

3. The apparatus of claim 1, wherein said notification apparatus is positioned within a portable telephone.

4. The apparatus of claim 1, wherein said notification apparatus is positioned within a beeper.

5. The apparatus of claim 1, wherein said notification apparatus is positioned within a danger notification apparatus.

6. The apparatus of claim 1, wherein said notification apparatus is coupled with an alarm clock.

7. The apparatus of claim 6, wherein said notification apparatus is positioned within a mattress.

8. The apparatus of claim 1, wherein said first and second frequencies are different.

9. The apparatus of claim 8, wherein said first and second frequencies differ by an amount between 10 and 100 cycles.

10. The apparatus of claim 1, wherein said first and second frequency generators are of the switched type.

11. The apparatus of claim 1, wherein said first and second frequency generators are digitally controlled and current limited.

12. The apparatus of claim 1, wherein said first and second cylindrical transducers are each formed of a single element.

13. The apparatus of claim 1, wherein said first and second cylindrical transducers are each formed of a plurality of individual elements.

14. An apparatus for notifying a user of an incoming cellular telephone call, comprising:
   a cellular telephone body having at least a back surface;
   a first transducer positioned within said cellular telephone body perpendicular to said back surface and adapted to generate a first acoustic field;
   a first frequency generator coupled with said first transducer to drive said first transducer to generate said first acoustic field in response to an indication that an incoming cellular telephone call has been received;

a second transducer positioned coaxially to said first transducer and adapted to generate a second acoustic field; and a second frequency generator coupled with said second transducer to drive said second transducer to generate said second acoustic field in response to an indication that an incoming cellular telephone call has been received, said first and second acoustic fields exhibiting an overlapping portion within the user's tissue with said overlapping portion generating a vibrational sensation in the user's tissue, thereby indicating to the user that an incoming cellular telephone call has been received; and whereby said vibrational sensation is generated by a difference of frequency generated in said overlapping portion of said first and second acoustic fields wherein said difference of frequency being more than a threshold difference of frequency so as to generate the vibration sensation at said user's tissue.

15. The apparatus of claim 14, wherein said first and second frequencies are different.

16. The apparatus of claim 15, wherein said first and second frequencies differ by an amount between 10 and 100 cycles.

17. The apparatus of claim 14, wherein said first and second frequency generators are of the switched type.

18. The apparatus of claim 14, wherein said first and second frequency generators are digitally controlled and current limited.

19. The apparatus of claim 14, wherein said first and second transducers are each formed of a single element.

20. The apparatus of claim 14, wherein said first and second transducers are each formed of a plurality of individual elements.

21. A method for notifying a user of an incoming cellular telephone call, comprising the steps of:

providing a first transducer positioned within a cellular telephone body perpendicular to a back surface thereof;

driving said first transducer to generate a first acoustic field in response to an indication that an incoming cellular telephone call has been received;

providing a second transducer positioned coaxially to said first transducer;

driving said second transducer to generate a second acoustic field in response to an indication that an incoming cellular telephone call has been received, said first and second acoustic fields overlapping; and generating a vibrational sensation in or at the surface of a user's tissue when said overlapping fields overlap the user's tissue, thereby indicating to a user by a physical sensation on said user's tissue, that an incoming cellular telephone call has been received;

whereby said vibrational sensation is generated only in accordance with a difference of frequency generated in said overlapping portion by said first and second acoustic fields wherein said difference of frequency being a substantial difference of frequencies generated from not equal frequencies from the first and second transducers.

22. The method of claim 21, wherein said first and second frequencies are different.

23. The method of claim 22, wherein said first and second frequencies differ by an amount between 10 and 100 cycles.

24. The method of claim 21, further comprising the steps of:

driving said first transducer with a first frequency driver; and driving said second transducer with a second frequency driver.

25. The method of claim 24, wherein said first and second frequency drivers are of the switched type.

26. The method of claim 25, wherein said first and second frequency drivers are digitally controlled and current limited.

27. The method of claim 21, further comprising the step of forming each of said first and second transducer of a single element.

28. The method of claim 21, further comprising the step of forming each of said first and second transducer of a plurality of individual elements.

* * * * *